United States Patent
Farooqi et al.

(10) Patent No.: US 11,702,937 B2
(45) Date of Patent: Jul. 18, 2023

(54) INTEGRATED POWER PUMP

(71) Applicant: Saudi Arabian Oil Company, Dhahran (SA)

(72) Inventors: Rehan Farooqi, Rancho Cucamonga, CA (US); Amer A. Dhafiri, Dammam (SA); Nabeel M. AlOdan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/235,179

(22) Filed: Apr. 20, 2021

(65) Prior Publication Data

US 2022/0333487 A1  Oct. 20, 2022

(51) Int. Cl.
*F01D 1/36* (2006.01)
*F04D 5/00* (2006.01)
(Continued)

(52) U.S. Cl.
CPC ............. *F01D 1/36* (2013.01); *F04D 5/001* (2013.01); *F04D 17/161* (2013.01); *F16H 41/04* (2013.01); *F16H 41/26* (2013.01)

(58) Field of Classification Search
CPC .......... F01D 1/36; F04D 5/001; F04D 17/161; F04D 1/06; F04D 13/043; F16H 41/04
See application file for complete search history.

(56) References Cited

U.S. PATENT DOCUMENTS

| | | |
|---|---|---|
| 2,113,213 A | 4/1938 | Leonard |
| 4,067,665 A | 1/1978 | Schwartzman |

(Continued)

FOREIGN PATENT DOCUMENTS

| | | | |
|---|---|---|---|
| EP | 169682 A | * 1/1986 | ............. F01D 15/08 |
| EP | 0169682 A2 | 1/1986 | |
| EP | 0530573 B1 | 10/1997 | |
| EP | 2252798 B1 | 5/2018 | |
| FR | 685491 A | 7/1930 | |

OTHER PUBLICATIONS

Notification of Transmittal of the International Search Report and the Written Opinion of the International Searching Authority, or the Declaration dated Jul. 6, 2022 pertaining to International application No. PCT/US2022/022277 filed Mar. 29, 2022, pp. 1-14.

(Continued)

*Primary Examiner* — Courtney D Heinle
*Assistant Examiner* — Ryan C Clark
(74) *Attorney, Agent, or Firm* — Dinsmore & Shohl LLP

(57) ABSTRACT

A pump includes a housing, a process stream input, a process stream output, a power stream inlet, and a rotor. The rotor comprises an impeller, a shroud, and a turbine. The impeller comprises fluid motive elements positioned about a central axis of the rotor and extending outward to the shroud. The turbine comprises runners formed on an outwardly facing surface of the shroud of the rotor. The shroud extends radially about the fluid motive elements of the impeller. The rotor is rotatably supported within the housing. The runners cause the rotor to rotate when the power stream flows through a fluid path impinging the runners thereby transferring energy from the flow of the power stream received through a power stream inlet into rotational energy of the fluid motive elements of the impeller to propel the process stream from a process stream input out a process stream output.

19 Claims, 13 Drawing Sheets

(51) Int. Cl.
F04D 17/16 (2006.01)
F16H 41/04 (2006.01)
F16H 41/26 (2006.01)

(56) References Cited

U.S. PATENT DOCUMENTS

| | | | |
|---|---|---|---|
| 4,893,986 A | | 1/1990 | Catterfeld et al. |
| 4,913,631 A | | 4/1990 | Vandendorpe |
| 5,073,335 A | * | 12/1991 | Townsend ............ F04D 15/0005 |
| | | | 376/373 |
| 5,599,164 A | * | 2/1997 | Murray ..................... F04D 1/06 |
| | | | 415/198.1 |
| 6,425,737 B1 | * | 7/2002 | Hatanaka .................. F01D 1/36 |
| | | | 415/208.4 |
| 7,828,511 B1 | * | 11/2010 | Pinera .................... F04D 13/043 |
| | | | 416/198 A |
| 8,186,938 B2 | | 4/2012 | Young et al. |
| 8,177,489 B1 | * | 5/2012 | Pinera .................... F04D 13/043 |
| | | | 415/58.4 |
| 2005/0135944 A1 | * | 6/2005 | Matic .................... F04D 13/043 |
| | | | 417/405 |

OTHER PUBLICATIONS

"Turbopumps and Their Gas Supplies", https://wodeshu.gitee.io/roprop/text00013.html, Retrieved Mar. 29, 2021.

\* cited by examiner

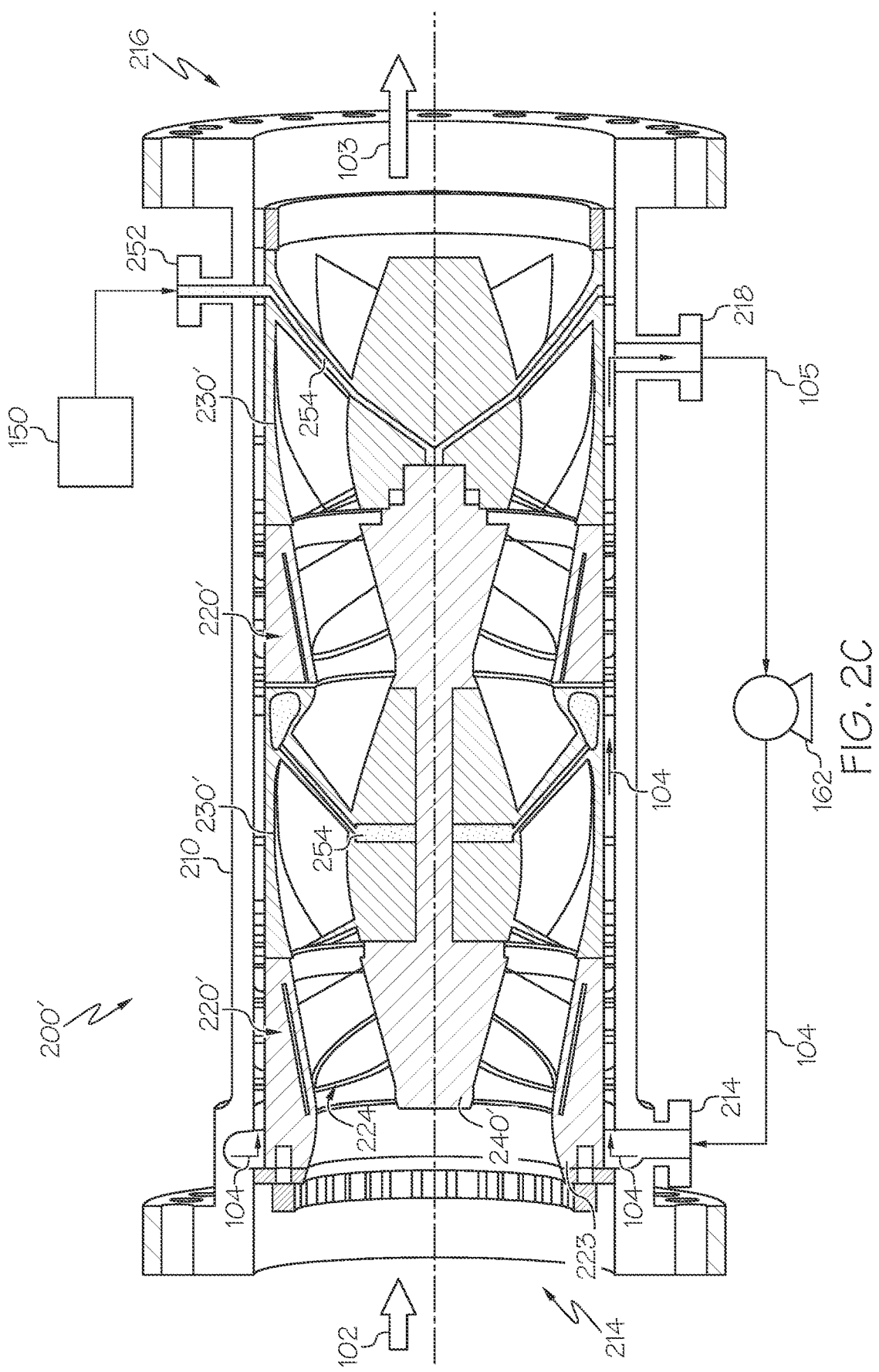

INTEGRATED POWER PUMP

TECHNICAL FIELD

Embodiments described herein generally relate to pumps and pump systems.

BACKGROUND

Pumps are devices designed to move fluids, such as gases, liquids, or slurries. Pumps typically convert electrical energy into hydraulic energy. However, there are applications where the use of an electrically driven pump can be hazardous since the fluid that is being moved is a volatile substance. Oilfields, including, for example, drill sites or offshore platforms, implement numerous pumps for controlling the production from wells. Conventional pumps include a driving mechanism, such as an electro-mechanical motor mechanically linked to a shaft and blades that propel a fluid through the pump. The shaft of a pump and the shaft of a motor are rotatably coupled using couplings, gears, bearings, and the like. These components enable electro-mechanical rotational motion generated by the motor to be transferred to the shaft of the pump and thereby drive the blades (e.g., the propeller or impeller) of the pump that propels fluid through the pump. Additionally, conventional pumps also include mechanical seals around rotating components such as the shaft that operates as pressure boundaries. However, mechanical seals can lead to reliability issues and couplings require alignment.

Accordingly, there is a need for improved pumps that reduce or eliminate the need for conventional electro-mechanical diving machines, mechanical seals, couplings that require alignment, and/or external bearing systems.

SUMMARY

In accordance with one embodiment of the present disclosure, a pump includes a housing, a process stream input opening, a process stream output opening, a power stream inlet, and a rotor. The process stream input opening is formed in the housing and is configured to receive a process stream. The process stream output opening is formed in the housing and is configured to output the process stream. The power stream inlet extends from an outer surface to an inner surface of the housing and is configured to receive a power stream. The rotor comprises an impeller, a shroud, and a turbine. The impeller comprises one or more fluid motive elements positioned about a central axis of the rotor and extending outward to the shroud. The turbine comprises one or more runners formed on an outwardly facing surface of the shroud of the rotor. The shroud extends radially about the one or more fluid motive elements of the impeller. The rotor is rotatably supported within the housing such that the shroud and the inner surface of the housing form a fluid path for the power stream to flow through the turbine. The one or more runners of the turbine cause the rotor to rotate when the power stream flows through the fluid path impinging the one or more runners of the turbine thereby transferring energy from the flow of the power stream received through the power stream inlet into rotational energy of the one or more fluid motive elements of the impeller to propel the process stream from the process stream input opening out the process stream output opening.

In accordance with another embodiment of the present disclosure, a pump system includes a high pressure pump and an integrated power pump. The integrated power pump comprises a housing, a process stream input opening, a process stream output opening, a power stream inlet, and a rotor. The high pressure pump is fluidly coupled to the integrated power pump and positioned remotely from the integrated power pump. The high pressure pump generates a power stream. The power stream inlet extends from an outer surface to an inner surface of the housing. The power stream inlet receives the power stream generated by the high pressure pump. The process stream input opening is formed in the housing and is configured to receive a process stream. The process stream output opening is formed in the housing and is configured to output the process stream. The rotor comprises an impeller, a shroud, and a turbine. The impeller comprises one or more fluid motive elements positioned about a central axis of the rotor and extending outward to the shroud. The turbine comprises one or more runners formed on an outwardly facing surface of the shroud of the rotor. The shroud extends radially about the one or more fluid motive elements of the impeller. The rotor is rotatably supported within the housing such that the shroud and the inner surface of the housing form a fluid path for the power stream to flow through the turbine. The one or more runners of the turbine cause the rotor to rotate when the power stream flows through the fluid path impinging the one or more runners of the turbine thereby transferring energy from the flow of the power stream received through the power stream inlet into rotational energy of the one or more fluid motive elements of the impeller to propel the process stream from the process stream input opening out the process stream output opening.

In accordance with another embodiment of the present disclosure, A process for treating a process stream with a power stream with an integrated power pump comprising a housing, a process stream input opening, a process stream output opening, a power stream inlet, and a rotor is disclosed. The process includes receiving the power stream through the power stream inlet, the power stream inlet extends from an outer surface to an inner surface of the housing of the integrated power pump and causing the rotor rotatably supported within the housing to rotate when the power stream flows through a fluid path defined by at least the inner surface of the housing and an outwardly facing surface of a shroud and the power stream impinges one or more runners of a turbine of the rotor formed on the outwardly facing surface of the shroud of the rotor. The process further includes propelling the process stream, with one or more fluid motive elements positioned about a central axis of the rotor and extending outward to the shroud, from the process stream input opening out the process stream output opening as an exit process stream when the rotor rotates in response to the power stream flowing through the turbine and intermixing the power stream with the exit process stream such that the integrated power pump outputs the power stream and the exit process stream together through the process stream output opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2C is a cross-sectional view of a illustrative multistage integrated power pump having an external lubrication port according to one or more embodiments shown and described herein;

DETAILED DESCRIPTION

Figure 1:
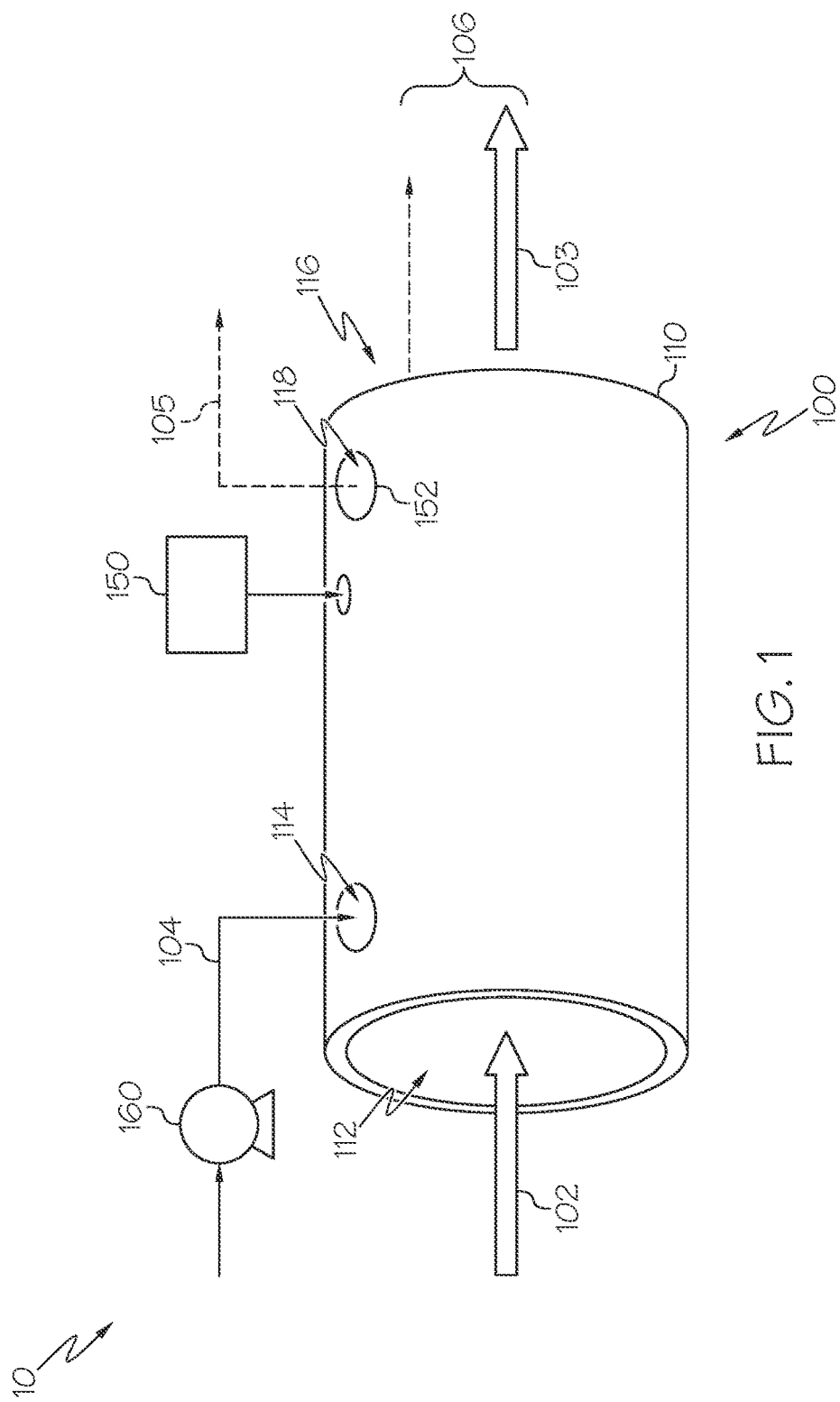
FIG. 1 is an illustrative schematic of a pump system according to one or more embodiments shown and described herein.

Embodiments of the present disclosure are directed to integrated power pumps having a pump housing (e.g., a cylindrical enclosure) with an integrated rotor positioned therein about a central axis. The integrated rotor includes an impeller, a shroud, and a turbine positioned radially about the impeller. The impeller includes one or more fluid motive elements such as blades or vanes positioned about the central axis of the rotor and extending outwardly to a shroud. The turbine having one or more turbine runners or the like are positioned on an outward facing surface of the shroud that is integrally formed with the impeller. The impeller, the shroud, and the turbine are integrated in a single rotating element, referred to herein as the rotor, positioned in a seal-less casing (e.g., the cylindrical enclosure) optionally with bearings lubricated by a process fluid, power fluid, or an external lubricant source. As described in more detail herein, various types of turbines may be implemented. For example, the turbine includes one or more runners that may be blades, vanes, parallel discs or the like. For example, the turbine may be a radial or mixed flow type turbine, a Tesla turbine, or other type. The pump impeller and turbine may be either radial, mixed, or axial flow type.

The integrated power pumps of the present disclosure eliminate the need for conventional drivers such as electromechanical motors and a separate turbine. Additionally, as described in more detail herein, integrated power pumps eliminate mechanical seals by eliminating holes in pressure boundary through which rotating components such as a shaft exit the pump. Moreover, integrated power pumps described herein do not require external bearings, couplings, or shafts.

As used herein, the term "rotor" refers to the rotating element within, for example, a cylindrical enclosure or other closed shape. The rotor includes a turbine, a shroud, and an impeller. In some embodiments, the rotor may include more than one shroud having turbine elements. As used herein, the term "turbine" refers to the rotor elements that receive energy from a power stream to rotatably drive the rotor thereby rotating the impeller integrated in the rotor. The term "impeller" refers to the rotor component that propels a process stream through the pump, optionally increasing the flow and/or pressure of the process fluid received at a process stream inlet of the pump and propelled out the process stream outlet of the pump. The impeller rotates in response to a power stream driving the turbine. Since the turbine and the impeller are integrated as a single component and rotate together, their operation is coupled by constant torque characteristics.

The pump includes two main inlets. One inlet is configured to receive a power stream and the other is configured to receive a process stream. The term "power stream" refers to a high pressure fluid flow that enters a first inlet in the cylindrical enclosure and impinges or otherwise transfers fluid flow energy to the turbine causing the rotor to rotate. The term "process stream" refers to a low pressure fluid flow that enters a second inlet in the cylindrical enclosure and impinges or is drawn in by the impeller. The terms high pressure and low pressure refer to the relative pressure difference between the power stream and process stream. For example, the power stream generally has a higher pressure than the process stream. The energy from the high pressure of the power stream drives the turbine of the pump causing the rotor to rotate and the impeller to add energy to the process stream.

The following will now describe systems that implement the integrated pumps and embodiments of the integrated pumps in more detail with reference to the drawings and where like numbers refer to like structures.

Referring to FIG. 1, an illustrative schematic of a pump system 10 implementing an integrated power pump 100 according to one or more embodiments described herein is depicted. The integrated power pump 100 of the present disclosure eliminates the need for a separate conventional driving machine that is mechanically coupled to the impeller of the pump. That is, conventional driving machines such as motors and the associated linkages are not required or at least not directly coupled to the integrated power pump 100. Accordingly, required maintenance may be decreased and reliability increased for an integrated power pump 100 as compared to conventional pumps driven by driving machines such as motors that utilize external shaft, shaft linkages, external bearings, and mechanical seals that can wear out, become misaligned, or otherwise fail.

Instead of directly incorporating or mechanically coupling a conventional driving machine to a shaft and driving an impeller coupled thereto, embodiments of the integrated power pump 100 utilize a power stream 104 fluid flow to drive the impeller and cause the flow or increase the flow and pressure of a process stream 102. In general, the integrated power pump 100 receives a process stream 102 through a process stream inlet 112 in a housing 110 of the integrated power pump 100. The integrated power pump 100 also receives a power stream 104 through a power stream inlet 114 in the housing 110 of the integrated power pump 100. Within the housing 110 of the integrated power pump 100 is a turbine rotor rotatably supported on a shaft. The turbine rotor, embodiments of which will be described in more detail herein, is a rotor having a turbine element and an impeller integrated into a single unit, the turbine rotor.

The power stream 104 that is delivered to the power stream inlet 114 has a higher pressure than the process stream 102 received at the process stream inlet 112. The power stream 104 may be a high pressure, small volume bleed stream produced by a high pressure pump 160. The high pressure pump 160 is fluidly coupled to the power stream inlet 114 of the integrated power pump 100 but located remotely from the integrated power pump 100 such that the electrically powered motor or combustion driven motor of the high pressure pump 160 such that the integrated power pump 100 can operate in a hazardous environment. For example, the integrated power pump 100 may operate in an environment that includes flammable gases or liquids such as flammable hydrocarbons. The power stream 104 is a fluid such as a hydrocarbon free fluid like water, the same or similar type of fluid as the process stream, or another non-volatile fluid. Therefore, the integrated power pump 100 may be utilized in applications such as pumping flammable hydrocarbons in pits and sumps or the like.

In some embodiments, the power stream 104, once it impinges the turbine of the rotor of the integrated power pump 100 to drive the impeller, the power stream 104 may be expelled from the integrated power pump 100 through a power stream outlet 118. In some embodiments, however, the power stream 104 may be mixed with the exit process stream 103 and output as a common fluid flow 106 through a process stream outlet 116 of the integrated power pump 100. In embodiments where the power stream 104 is output through the power stream outlet 118 instead of mixing with the exit process stream 103, the power stream may be fed back to the high pressure pump 160 where it may be pressurized for use again as a power stream 104 input stream to drive the turbine of the integrated power pump 100.

In some embodiments, the integrated power pump 100 may be installed directly in a pipeline or suction piping. In some applications, a downstream pump produces a high pressure, however a high suction pressure to Net Positive Suction Head (NPSH) is needed. In conventional systems, a separate booster pump with motor and mechanical seals are needed to provide the NPSH to the main high pressure pump. However, the integrated power pump 100 of the present disclosure can be implemented to receive a high pressure, small volume bleed stream (e.g., the power stream 104) produced by the main high pressure pump that will drive the seal-less integrated power pump 100 and thereby generate the required NPSH through the process stream flow of the integrated power pump 100. Hence, the integrated power pump 100 provides a new arrangement in high pressure pumping systems.

In other embodiments, as described above, implementation of the integrated power pump 100 can eliminate the use of electrically driven pumps running in hazardous environments. For example, vertically suspended pumps are used to pump flammable hydrocarbons in pits and sumps. In such applications, typically, a motor is mounted above the sump and a shaft runs into the sump connected to impellers. This undesired system can rub causing sparks. Additionally, the motor or related electrical components can fault and/or cause sparks. A solution for making the pumping of flammable hydrocarbons less volatile is to make use of an integrated power pump 100 and a dedicated high pressure pump using a non-flammable or fire resistant fluid (e.g., a hydrocarbon free fluid) such as water or hydraulic oil for the power stream. The non-flammable fluid or fire resistant fluid (e.g., hydrocarbon free fluid) may be routed through piping to the submerged integrated power pump 100, which will pump the hazardous fluid through piping to a desired destination. The clean driving fluid (e.g., water) can be mixed into the pumped process fluid or it can be routed back for recycling. Such an embodiment results in a less volatile operation of a pump in flammable fluid exposed to atmosphere, since no rotating part is exposed to atmosphere and no source of exposed energy exists.

In some embodiments, the integrated power pump 100 also includes a lubrication inlet 152 for receiving lubrication fluid 150 to lubricate the bearings and the like within the integrated power pump 100. As described in more detail herein, the integrated power pump 100 has a stationary shaft configuration or a rotating shaft configuration that is rotatably coupled to the rotor. In a stationary shaft configuration, the rotor rotates around the stationary shaft. The internal surfaces of the rotor and shaft are designed to provide a bearing effect, for example, through hydrodynamic phenomenon or hydrostatic phenomenon depending on fluid characteristics.

The stationary shaft may be fixed to stationary components of the integrated power pump 100 such as the housing, optionally, through a stator element within the integrated power pump 100. In a rotating shaft configuration, the shaft is connected or is part of the integrated rotor. The shaft rotates against internal surfaces of stationary components such that bearing effects are achieved, for example, through hydrodynamic phenomenon or hydrostatic phenomenon depending on fluid characteristics. In some embodiments, a bearing component may be incorporated to rotatably support the rotor and shaft engagement and/or the shaft and a stationary component engagement depending on the shaft configuration.

The hydrodynamic phenomenon or hydrostatic phenomenon enabling the bearing effect between the rotor and shaft or the shaft and a stationary component within the integrated power pump 100 may be achieved using fluid flow from the power stream, the process stream, or a lubrication fluid 150 provided from an external source.

Figure 2A:
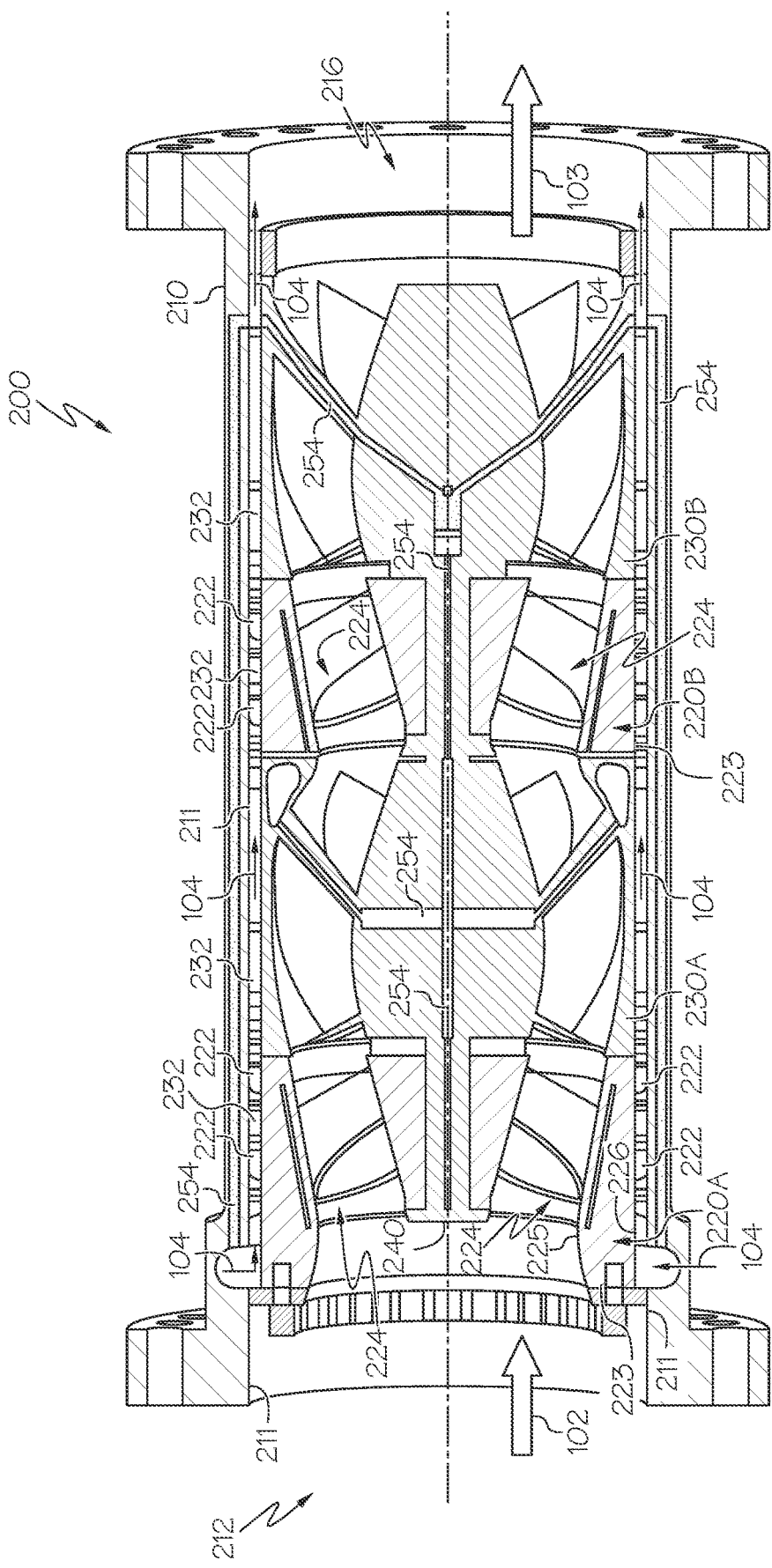
FIG. 2A is a cross-sectional view of an illustrative multistage integrated power pump according to one or more embodiments shown and described herein.
Figure 2B:
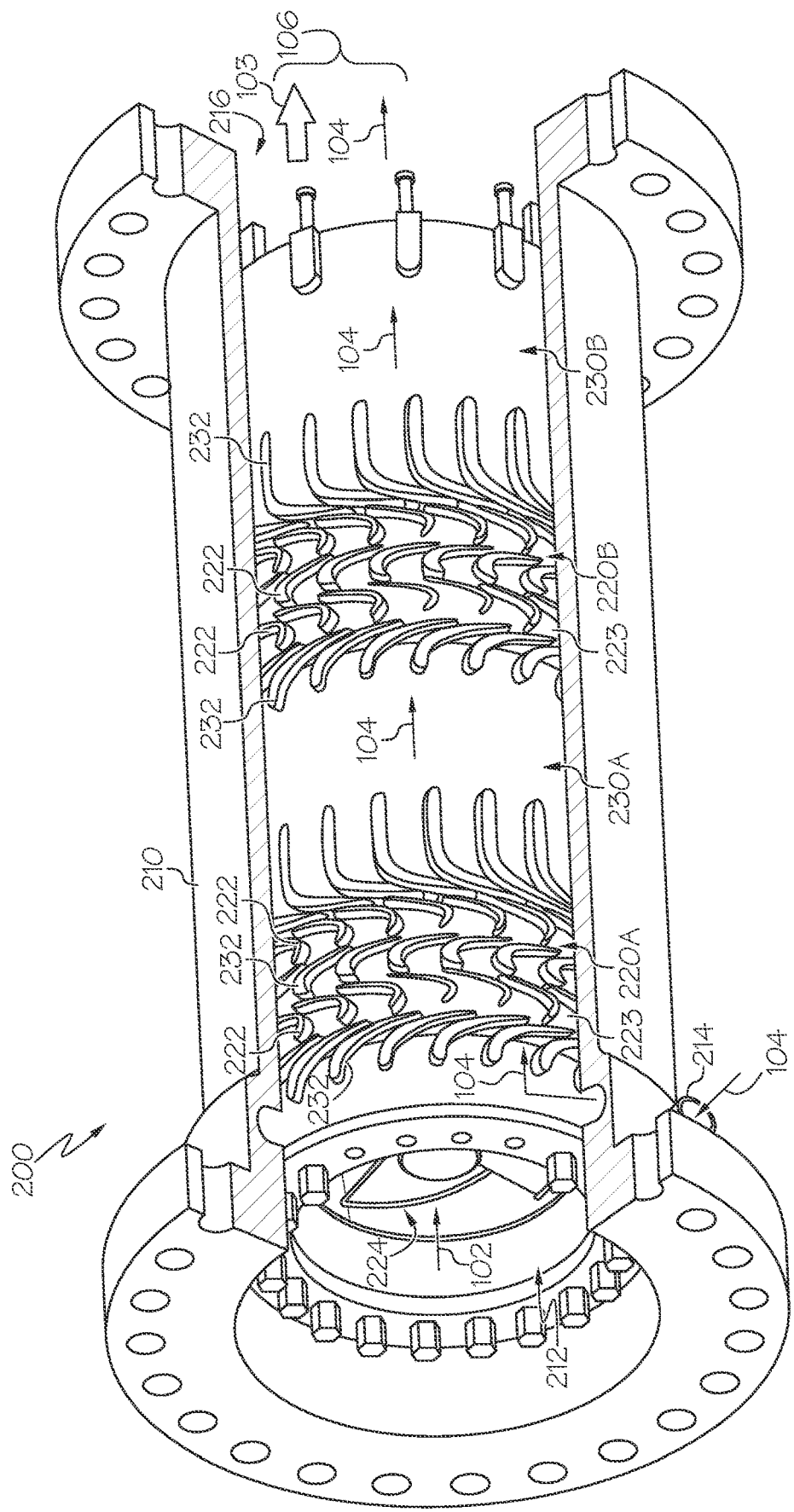
FIG. 2B is a perspective view of the illustrative multistage integrated power pump with a portion of the pump enclosure cutaway according to one or more embodiments shown and described herein.

The following embodiments will now more completely describe embodiments of the integrated power pump 100 with reference to FIGS. 2A-2C, 3, 4A-4C, 5A-5B, 6, and 7A-7C. Referring to FIGS. 2A-2C, illustrative views of multistage integrated power pump 200 are depicted. In particular, FIG. 2A depicts a lengthwise cross-sectional view along the centerline of an illustrative multistage integrated power pump 200. The multistage integrated power pump 200 depicted in FIGS. 2A and 2B illustrate a rotor 220 and stator 230 configuration implementing a stationary shaft 240 configuration. FIG. 2B depicts the same multistage integrated power pump 200 depicted in FIG. 2A, but illustrates the rotors 220 (e.g., the first rotor 220A and the second rotor 220B) and the stators 230 (e.g., the first stator 230A and the second stator 230B) through a cutaway portion of the housing 210 to depict the turbine runners 222 and the turbine stators 232 of the multistage integrated power pump 200. FIG. 2C also depicts a multistage integrated power pump, but the multistage integrated power pump 200' illustrated in FIG. 2C includes a rotor 220 and stator 230 configuration implementing a rotating shaft 240' configuration and an embodiment where lubrication is provided via an external source of lubrication fluid 150.

The cross-sectional view in FIG. 2A depicts the internal structure of the multistage integrated power pump 200 in an axial flow configuration. The multistage integrated power pump 200 includes a housing 210 that is a cylindrical enclosure having an opening on each end. A first opening is configured as the process stream inlet 112 that receives a process stream 102 and the second opening is configured as the process stream outlet 116 that outputs an exit process stream 103 that has an increased flow and/or pressure as compared to the process stream 102 received at the process stream inlet 112. The multistage integrated power pump 200 increases the flow and/or pressure of the process stream 102 by adding energy to the process stream 102 through a series of rotors 220 having one or more fluid motive elements 224 that are rotated in response to a power stream 104 that impinges a plurality of turbine runners 222 integrated on an outward facing surface 221 for the rotor 220.

The multistage integrated power pump 200 illustrated in FIGS. 2A and 2B includes two stators 230. The stators 230 are interleaved between the rotors 220. That is, the process stream 102 is received through the process stream inlet 212 in the housing 210 and flows through the first rotor 220A, where the first rotor 220A increases the flow and/or pressure of the process stream 102. The process stream 102 then passes through the first stator 230A and into the one or more fluid motive elements 224 of the second rotor 220B. The one or more fluid motive elements 224 of the second rotor 220B may further increase the flow and/or pressure of the process stream 102, which then passes through the second stator 230B and out the process stream outlet 216.

The rotor 220, for example, as implemented in the multistage integrated power pump 200 is referred to as an axial flow pump type rotor 220. That is, the process stream 102 and the power stream 104 flow axially through the integrated power pump 200. The rotor 220 has one or more fluid motive elements 224 such as blades or vanes extending from a center of the rotor 220 outward to a shroud 223. The shroud 223 at least extends radially about the one or more fluid motive elements 224 forming the impeller portion of the rotor 220. The shroud 223 includes a first surface 225 that faces inward to the center of the rotor 220 and encloses the one or more fluid motive elements 224. The enclosure formed by the shroud 223 defines a flow path for the process stream 102 through the rotor 220. The shroud 223 further includes a second surface 226 that is opposite the first surface 225 and faces outward from the center of the rotor 220. A plurality of turbine runners 222 are integrated on the second surface 226 of the shroud 223 and extend outwardly therefrom. The plurality of turbine runners 222 are shaped to capture energy from the power stream 104 that is input through a power stream inlet 214. The turbine runners 222 may be vane type, blade type, volute type, Pelton type, or the like.

The rotor 220 is rotatably supported within the cylindrical enclosure of the housing 210. The rotor 220 is positioned such that the second surface 226 and an inner surface 211 of the housing 210 form a fluid path for the power stream 104 to flow through the integrated power pump 200. The fluid path for the power stream 104 is illustrated by the arrows 104 indicating the power stream 104 flow path through the integrated power pump 200. In some embodiments, the fluid path further is fluidly coupled to the process stream output opening such that the power stream 104 can intermix with the exit process stream 103 and exit the pump as an intermixed fluid flow. In some instances, the power stream may be a hydrocarbon free fluid such as water that is pressurized by a remotely located high pressure pump 160 and routed through piping to the integrate power pump 200 which may be configured within an environment to pump hazardous fluid such as a hydrocarbon fluid through the integrate power pump 200 and piping to a desired destination. The use of a hydrocarbon free fluid such as water as the power stream allows the integrated power pump to operate in a flammable fluid exposed to atmosphere or otherwise hazardous environment thereby reducing and/or eliminating the risk of fire or explosion. Furthermore, the intermixing of the hydrocarbon free fluid such as water (e.g., the power stream 104) and the process stream 102 that includes a hydrocarbon fluid may reduce the combustibility of the exit process stream 103 that is pumped to the desired destination. A post process, for example, that occurs at the desired destination may reclaim the water from the process stream and route it back through a recycling process for use as a power stream 104 again.

In some embodiments, the power stream 104 may not be intermixed with the exit process stream 103, but rather routed out of the integrated power pump 200 through a power stream outlet 218 as described in more detail herein.

For example, a process for treating a hydrocarbon based process stream with a hydrocarbon free based power stream may include intermixing the two streams using an integrated power pump as described herein. The integrated power pump may include a housing, a process stream input opening, a process stream output opening, a power stream inlet, and an integrated rotor. The process, for example, includes receiving a power stream through the power stream inlet, the power stream inlets extends from an outer surface to an inner surface of the housing of the integrated power pump. The power stream causes the integrated rotor rotatably supported within the housing to rotate as the power stream flows through a fluid path defined by at least an inner surface of the housing and an outwardly facing surface of the shroud and the power stream impinges one or more runners of the turbine formed on an outwardly facing surface of the shroud of the rotor. In response to the power stream causing the rotor to rotate, the process stream may be propelled, with the one or more fluid motive elements positioned about a central axis of the rotor and extending outward to the shroud, from the process stream input opening out the process stream output opening as an exit process stream. The integrated power pump may be further configured to fluidly couple the fluid path of the power stream with the fluid path of the process stream such that intermixing of the power stream with the exit process stream occurs. That is, the integrated power pump outputs the power stream and the exit process stream together through the process stream output opening.

Referring back to the positioning of the rotor 220 within the housing, the rotor 220 is positioned in the housing such that a clearance between the plurality of turbine runners 222 and the inner surface 211 of the cylindrical enclosure of the housing 210 is minimal. There needs to be very little clearance between the plurality of turbine runners 222 and the inner surface 211 so that the power stream 104 impinges the plurality of turbine runners 222 and causes the rotor 220 to rotate instead of the power stream 104 flowing effortlessly in the clearance between the plurality of turbine runners 222 and the inner surface 211. Furthermore, the inner surface 211 includes a plurality of turbine stators 232. Turbine stators 232 may be positioned radially on the inner surface 211 and adjacent to radial loops of the plurality of turbine runners 222. The turbine stators 232 direct the fluid flow of the power stream 104 so that the power stream 104 impinges the plurality of turbine runners 222 causing rotation of the rotor 220. The turbine stators 232 may be configured in a vane (e.g., bladed) configuration or a volute type configuration.

Still referring to FIGS. 2A and 2B, the power stream 104 is further utilized for lubrication. A portion of the power stream 104 received through the power stream inlet 214 flows through the one or more arteries 254. The arteries 254 fluidly extend through the housing 210, the stators 230, and the stationary shaft 240. The shaft 240 of the multistage integrated power pump 200 depicted in FIGS. 2A and 2B is a stationary shaft 240 configuration. That is, the stationary shaft 240 is an integral component of the stators 230 that are further fixedly coupled to the housing 210. The portion of the power stream 104 that flows through the arteries 254 functions as lubrication to the interface between the stationary shaft 240 and rotors 220 thereby creating a hydrodynamic bearing or hydrostatic bearing. The portion of the power stream 104 that functions as lubrication to the rotors 220 and the stationary shaft 240 interface may intermix with the process stream 102 as it exits the arteries 254 when generating the hydrodynamic bearing or hydrostatic bearing.

Turning to FIG. 2C, the multistage integrated power pump 200' illustrated in FIG. 2C inclues rotors 220' and stators 230' in a configuration implementing a rotating shaft 240' and an embodiment where lubrication is provided via an external source of lubrication fluid 150. That is, instead of a portion of the power stream 104 being diverted through the arteries 254 to generate a hydrodynamic bearing or a hydrostatic bearing; an external source of lubrication fluid 150 provides a lubrication flow through the arteries 254. The lubrication fluid 150 flows into the arteries 254 through a lubrication inlet 252. Furthermore, the multistage integrated power pump 200' depicts a configuration implementing a rotating shaft 240'. That is, the shaft 240' is integrally formed with the rotors 220'. That is, shaft 240' rotates with respect to internal surfaces of stationary components such as the stators 230'. Moreover, as described herein, the lubrication provided by an external source or the power stream 104 or the process stream 102 generates a hydrodynamic bearing or a hydrostatic bearing between the shaft 240' and the internal surfaces of stationary components such as the stators 230'.

FIG. 2C further depicts an embodiment of the multistage integrated power pump 200' where the power stream, as described with reference to FIG. 1, may be circulated through the multistage integrated power pump 200' and then pressurized by a remotely located high pressure pump 160. For example, a power stream 104 is received by the multistage integrated power pump 200' through a power stream inlet 214. Once the power stream 104 flow through multistage integrated power pump 200' causing the one or more fluid motive elements 224 of the rotors 220' to rotate by impinging the integrally coupled turbine runners 222, the power stream 104 exits the multistage integrated power pump 200' through the power stream outlet 218, rather than being mixed into the exit process stream 103 that exits the multistage integrated power pump 200' through the process stream outlet 216. The return flow 105 of the power stream 104, which has a lower energy and/or pressure as compared to the power stream 104 that enters the multistage integrated power pump 200' is received by the high pressure pump 160. The high pressure pump 160 recirculates the power stream 104 by increasing the energy, flow, and/or pressure of the power stream 104 that is then returned to the multistage integrated power pump 200' to continue to drive the rotors 220'.

It is understood that although the integrated power pumps depicted in FIGS. 2A-2C are multistage integrated axial flow power pumps, this is merely an example. In some embodiments, the integrated power pump may be a single stage power pump or use radial or mixed flow impellers. In yet other embodiments, the integrated power pump may be a multistage integrated power pump that includes more than two stages. Furthermore, in some embodiments, a plurality of power streams may be provided to the integrated power pump such that each power stream is configured to drive one or more rotors of each integrated power pump. In other words, independent power streams may drive different stages of the integrated power pump such that the energy of the process stream is integrally increased as it is driven through the integrated power pump.

Figure 3:
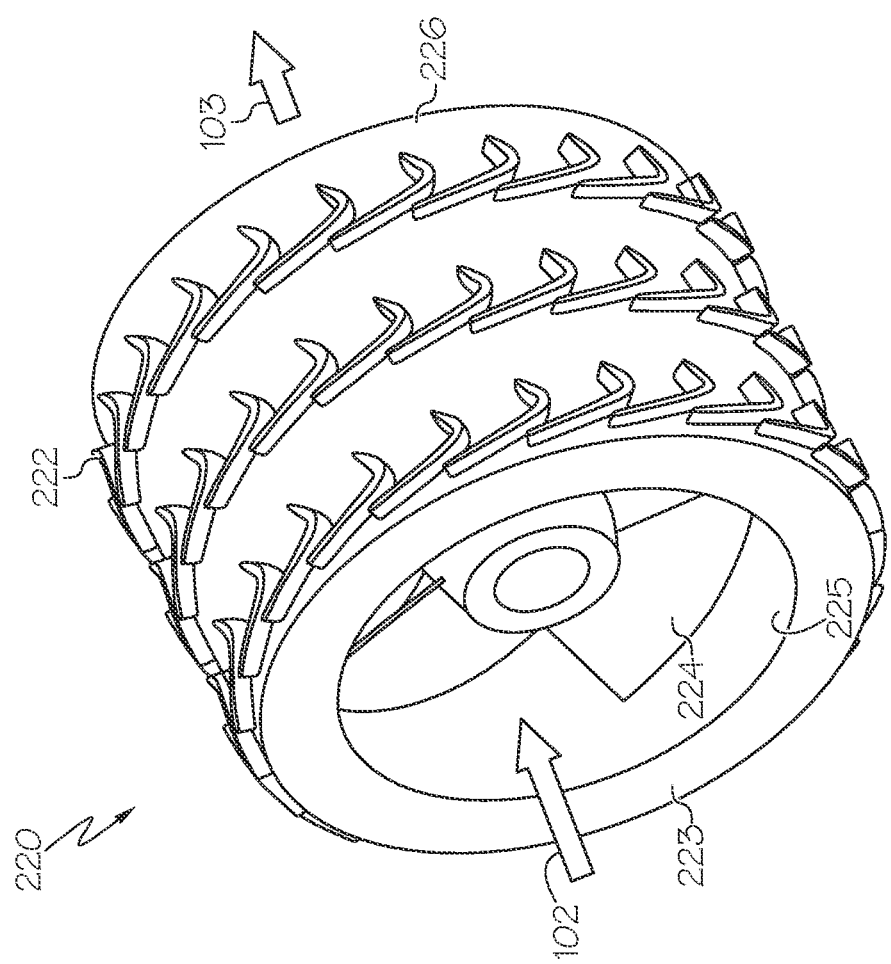
FIG. 3 is a perspective view of an illustrative axial rotor having turbine runners and an integrated axial pump impeller according to one or more embodiments shown and described herein.

Referring now to FIG. 3, a perspective view of a rotor 220 having a plurality of turbine runners 222 and one or more fluid motive elements 224 is depicted. FIG. 3 is provided to further illustrate that the rotor 220 is an integrally formed component of the integrated power pump described herein. That is, the rotor 220 includes a plurality of turbine runners 222 integrally coupled to one or more fluid motive elements 224 where the plurality of turbine runners 222 receive a power stream 104 that directly causes the one or more fluid motive elements 224 to rotate. As a result, the one or more fluid motive elements 224 drive a process stream 102 through the integrated power pump thereby generating an exit process stream 103 having an increased flow and/or pressure.

Figure 4B:
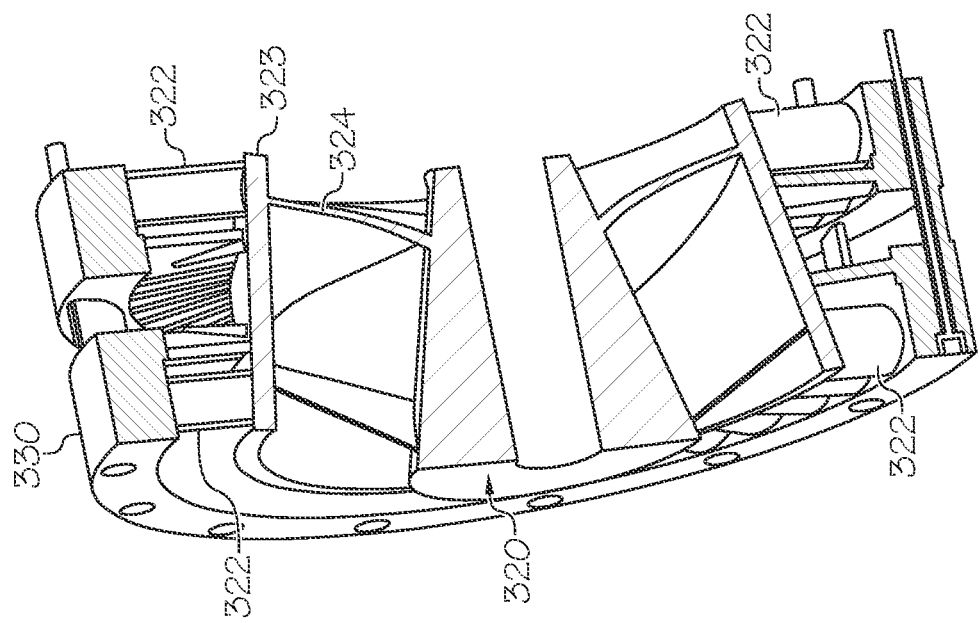
FIG. 4B is a cross-sectional view of the illustrative axial pump impeller having a mixed flow type turbine according to one or more embodiments shown and described herein.
Figure 4A:
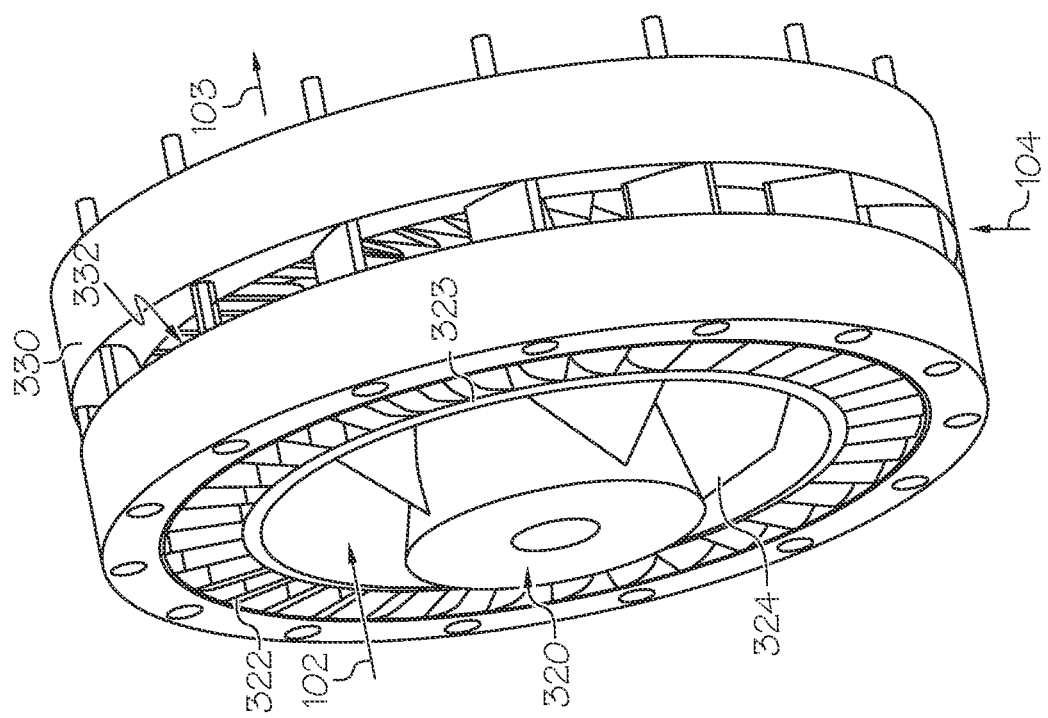
FIG. 4A is a perspective view of an illustrative axial pump impeller having a mixed flow type turbine according to one or more embodiments shown and described herein.
Figure 4C:
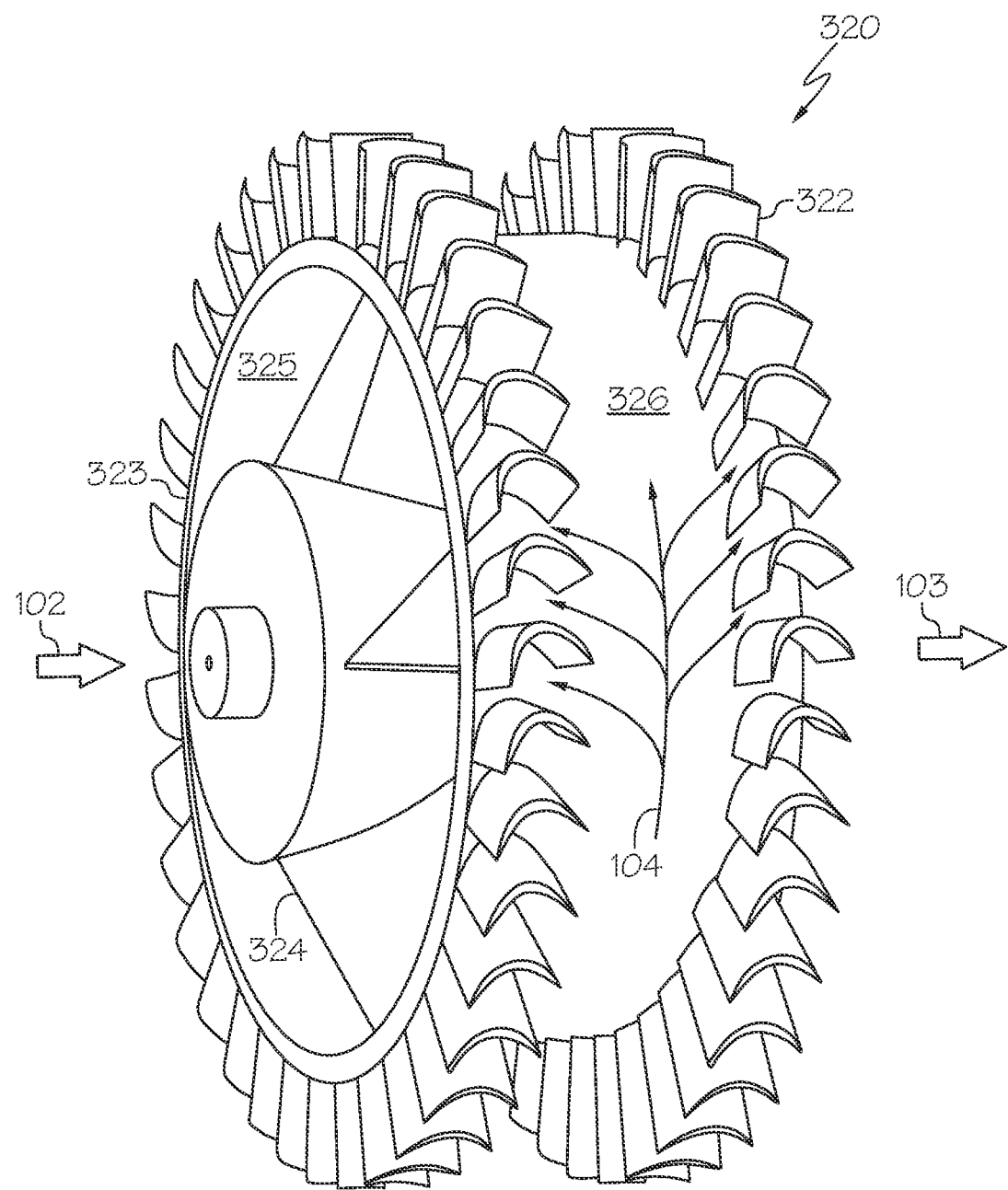
FIG. 4C depicts an illustrative embodiment of the integrated axial impeller and mixed flow type turbine according to one or more embodiments shown and described herein.
Figure 5A:
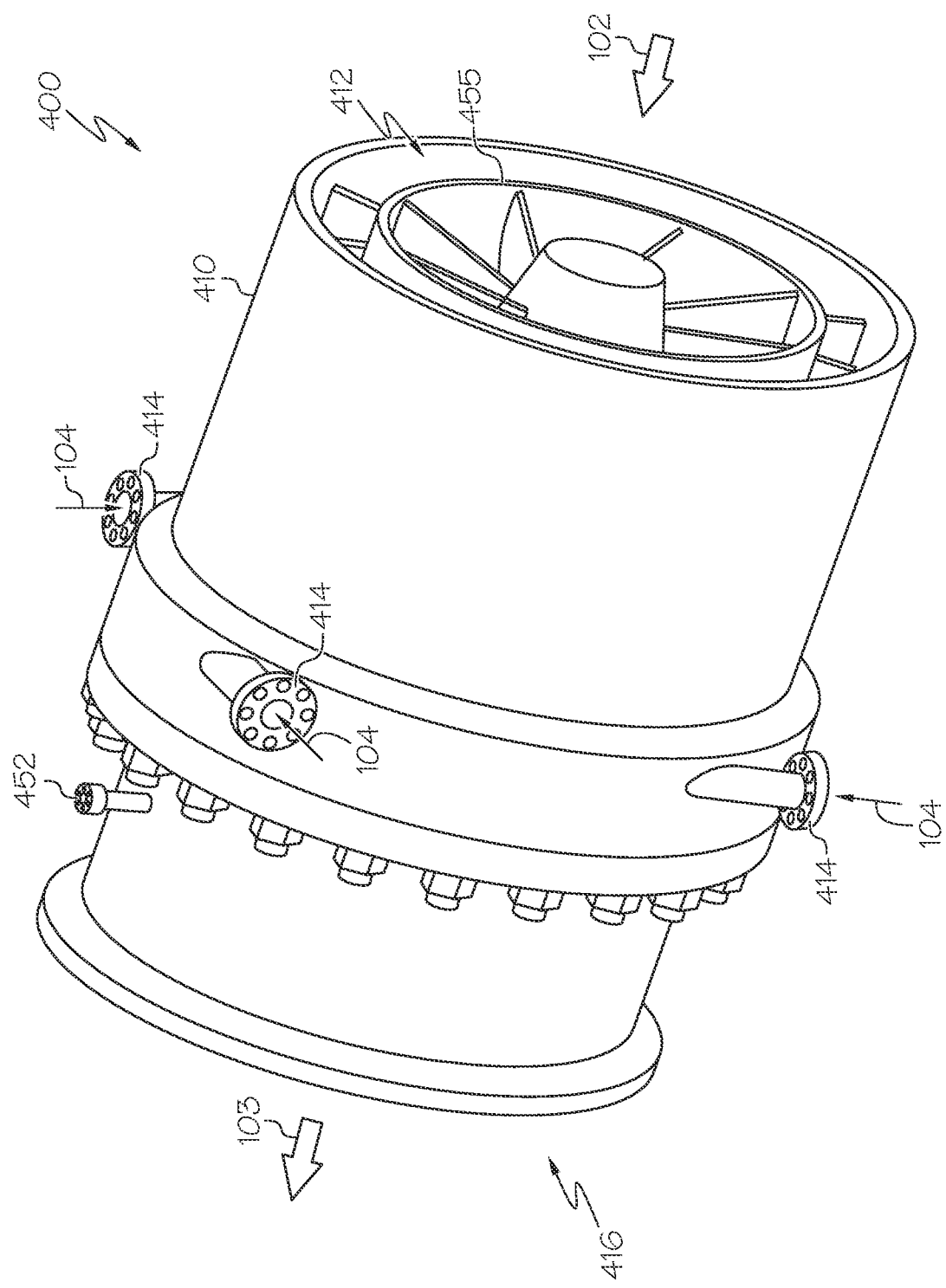
FIG. 5A is a perspective view of a single stage pump having an integrated axial impeller and a mixed flow type turbine according to one or more embodiments shown and described herein.
Figure 5B:
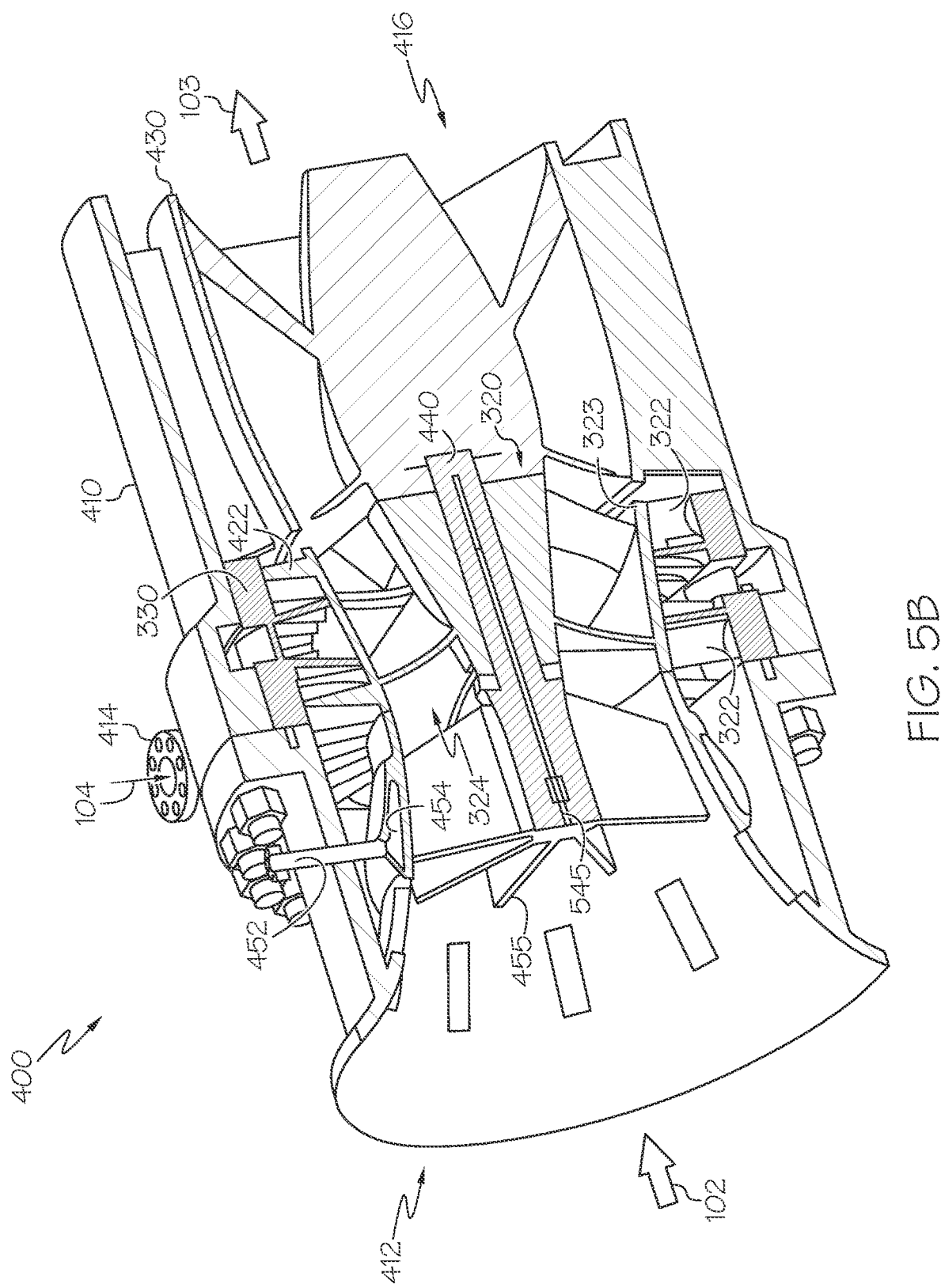
FIG. 5B is a cross-sectional view of the single stage integrated pump having an integrated axial impeller and mixed flow type turbine according to one or more embodiments shown and described herein.

Turning now to FIGS. 4A-4C, another embodiment of a stator 330 and rotor 320 combination for an integrated power pump (e.g., the integrated power pump 400 depicted in FIGS. 5A and 5B). In some embodiments, the rotor 320 may include a plurality of mixed flow type turbines 322 located on an outwardly facing surface 326 of the shroud 323 of the rotor 320 that is opposite the inwardly facing surface 325 of the shroud 323 of the rotor 320. The shroud 323 mechanically connects the turbine positioned on the outwardly facing surface 326 of the shroud 323 to the impeller positioned on the inwardly facing surface 325 of the shroud 323 and extending inward to a central axis of the rotor 320. In such embodiments, the power stream 104 may be provided through openings 332 within the stator 330 that directs the power stream 104 into a space between at least two circumferential and adjacent sets of mixed flow type turbines 322. The mixed flow type turbines 322 may be Pelton type turbine runners, for example. The power stream 104 may impinge the outwardly facing surface 326 and the plurality of mixed flow type turbines 322 as depicted by the power stream 104 flow arrows in FIG. 4C. As the power stream 104 impinges the plurality of mixed flow type turbines 322, the rotor 320 rotates. As the rotor 320 rotates the one or more fluid motive elements 324 integrally formed on the inwardly facing surface 325 of the rotor 320 rotate and draw in the process stream 102. The rotation of the one or more fluid motive elements 324 increases the flow and/or pressure of the process stream 102 causing an exit process stream 103 to be expelled from the rotor 320 and subsequently the integrated power pump that the rotor 320 is included within.

FIGS. 5A and 5B now depict an illustrative example of an integrated power pump 400 that implements the rotor 320 having an axial impeller and mixed flow type turbine configuration as depicted and described with reference to FIGS. 4A-4C. The integrated power pump 400 depicted in FIGS. 5A and 5B includes a housing 410, which may include one or more components forming an enclosure of the integrated power pump 400. The housing 410 of the integrated power pump 400 includes a process stream inlet 412 that receives a process stream 102 and a process stream outlet 416 that outputs an exit process stream 103 that is an increased flow and/or pressure flow of the process stream 102 received by the integrated power pump 400. The integrated power pump 400 further includes a plurality of power stream inlets 414 that are configured to provide one or more power streams 104 radially into the integrated power pump 400. The one or more power streams 104 are introduced radially about the rotor 320. For example, a power stream 104 is introduced tangentially into the integrated power pump 400 at 180-degree, 120-degree, 90-degree, 72-degree, 60-degree, 45-degree, 30-degree intervals or any angular spacing between 360 degrees and 0 degree around the housing 410.

In some embodiments, the process stream inlet 412 includes a plurality of guide vanes 455, which may be configured to ensure smooth hydraulic entry (e.g., aligned flow vectors) at the impeller inlet. The plurality of guide vanes 455 may be profiled (e.g., curved) to give a pre-rotation to the process stream 102 depending on the impeller design. In some embodiments, the plurality of guide vanes 455 or similar structure may be utilized to support a shaft 440 on one end. The shaft 440 may be supported on an opposite end by a stator 430 or other internal structure configured within the integrated power pump 400. The shaft 440 may be a rotating shaft or a stationary shaft. As described herein with respect to other embodiments of integrated power pumps, a hydrostatic bearing or hydrodynamic bearing may be generated using a lubrication 450 flow that is injected into the integrated power pump 400 through a lubrication inlet 452 or in some embodiments as a diversion of a portion of the power stream 104 and flowed through arteries 454 configured therein.

Figure 6:
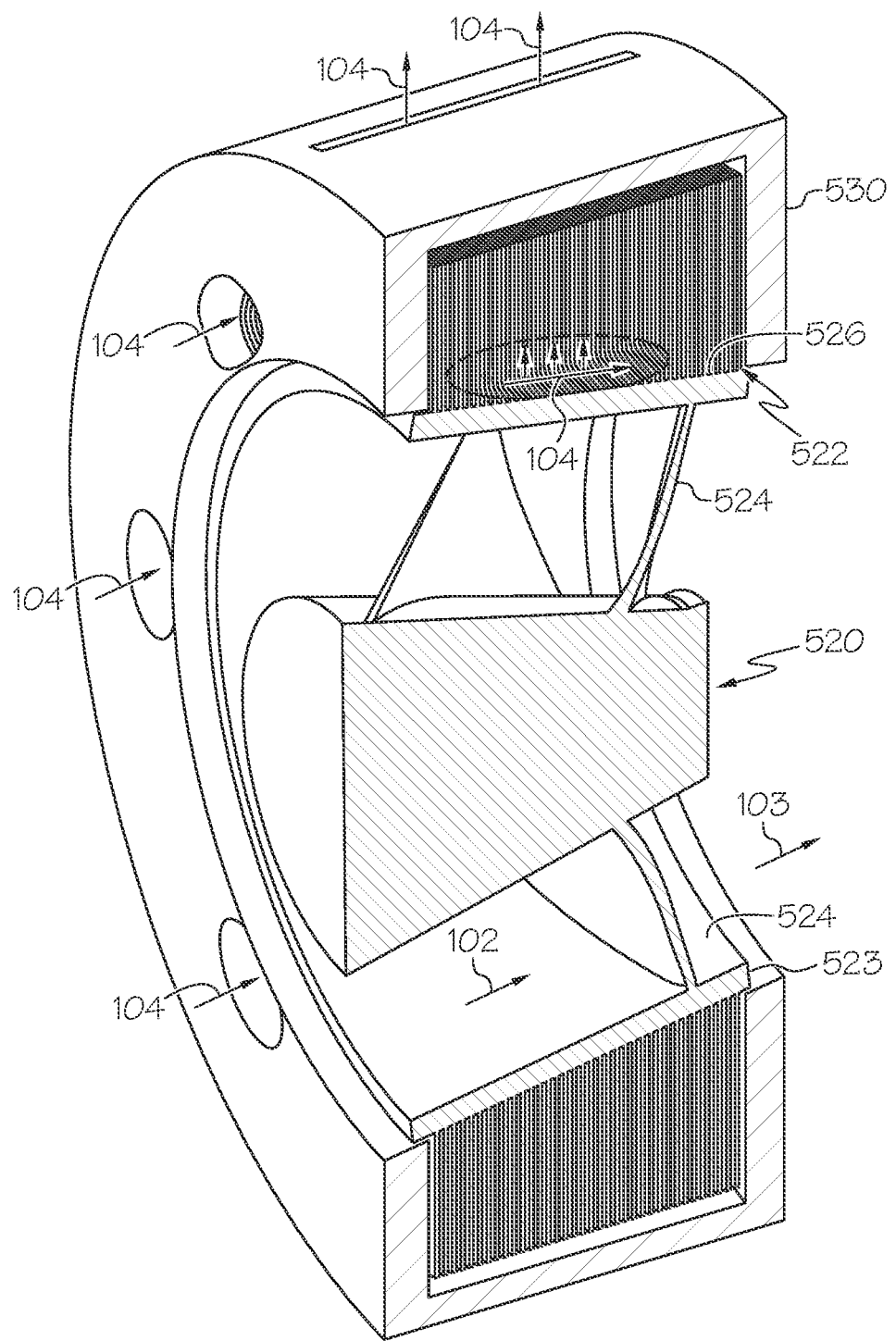
FIG. 6 depicts an illustrative embodiment of an integrated axial impeller and Tesla turbine for an integrated pump according to one or more embodiments shown and described herein.

In some embodiments, the turbine portion of the rotor for integrated power pumps described herein may be a Tesla type turbine. For example, as depicted in FIG. 6, the rotor 520 may be configured to include a Tesla turbine. A Tesla turbine includes a series or closely packed parallel disks 522 attached to an outer surface 526 of the shroud 523 of the rotor 520. The parallel disks 522 are further arranged within a chamber 530 that includes a series or inlets for receiving a power stream 104. When the power stream 104 enters the chamber 530 and passes between the parallel disks 522, the rotor 520 rotates thereby rotating the fluid motive elements 524. Similar to the previously described rotors, the shroud 523 at least extends radially about the one or more fluid motive elements 524 forming the impeller portion of the rotor 520. Accordingly, the parallel disks 522 positioned on the outer surface 526 of the shroud 523 are directly integrated with (e.g., around) the one or more fluid motive elements 524 of the impeller of the rotor 520. The rotary motion generated by the power stream 104 flowing within the parallel disks 522 of the Tesla type turbine drives the process stream 102 through the rotor 520 to generate an exit process stream 103. The rotor 520 may increase the flow and/or pressure of the process stream 102 generating a higher flow rate and/or higher pressure exit process stream 103 as compared to the process stream 102 that is received by the rotor 520.

Figure 7A:
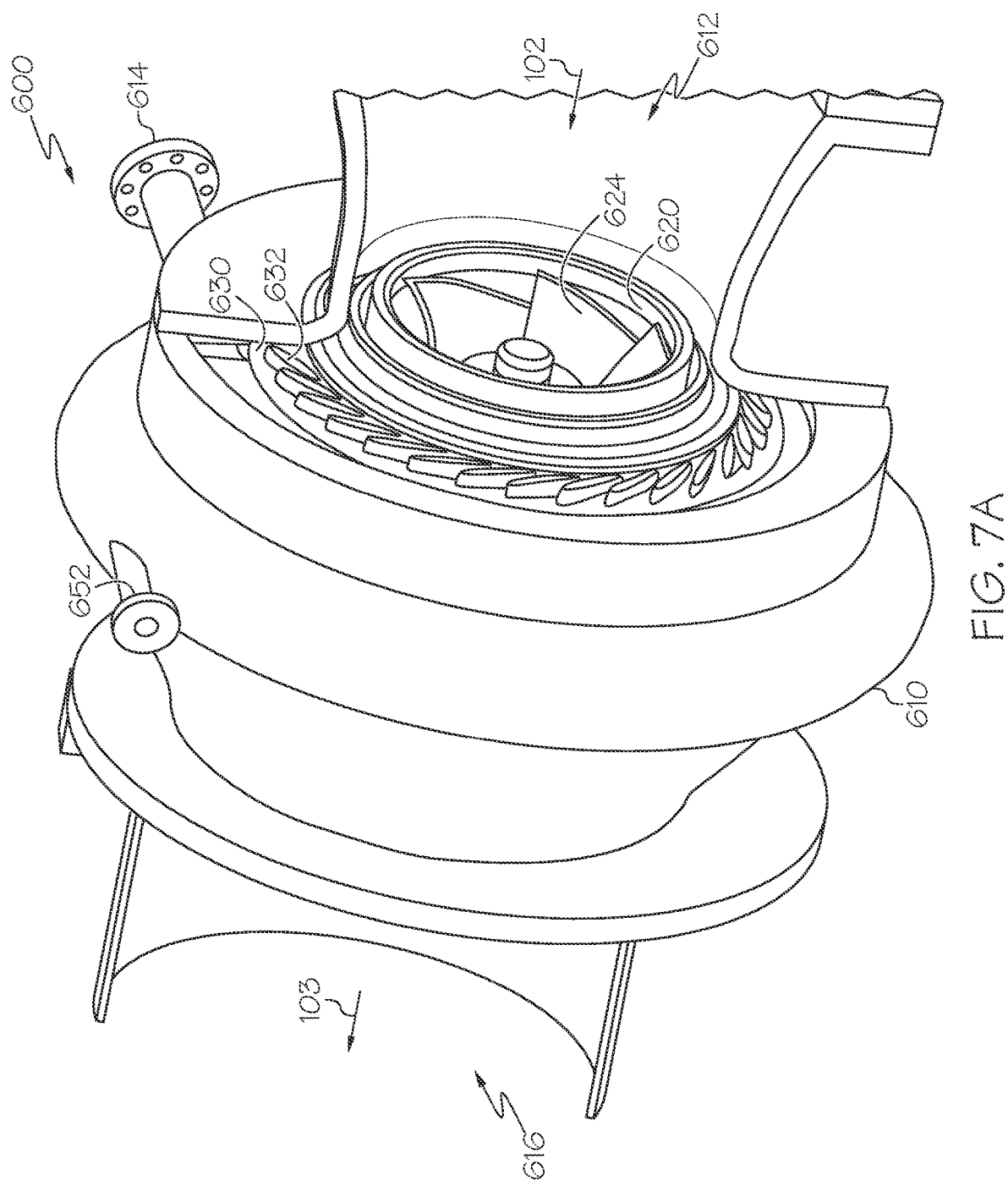
FIG. 7A is a perspective view of an integrated pump having an integrated radial-mixed flow impeller and radial turbine runners according to one or more embodiments shown and described herein.
Figure 7B:
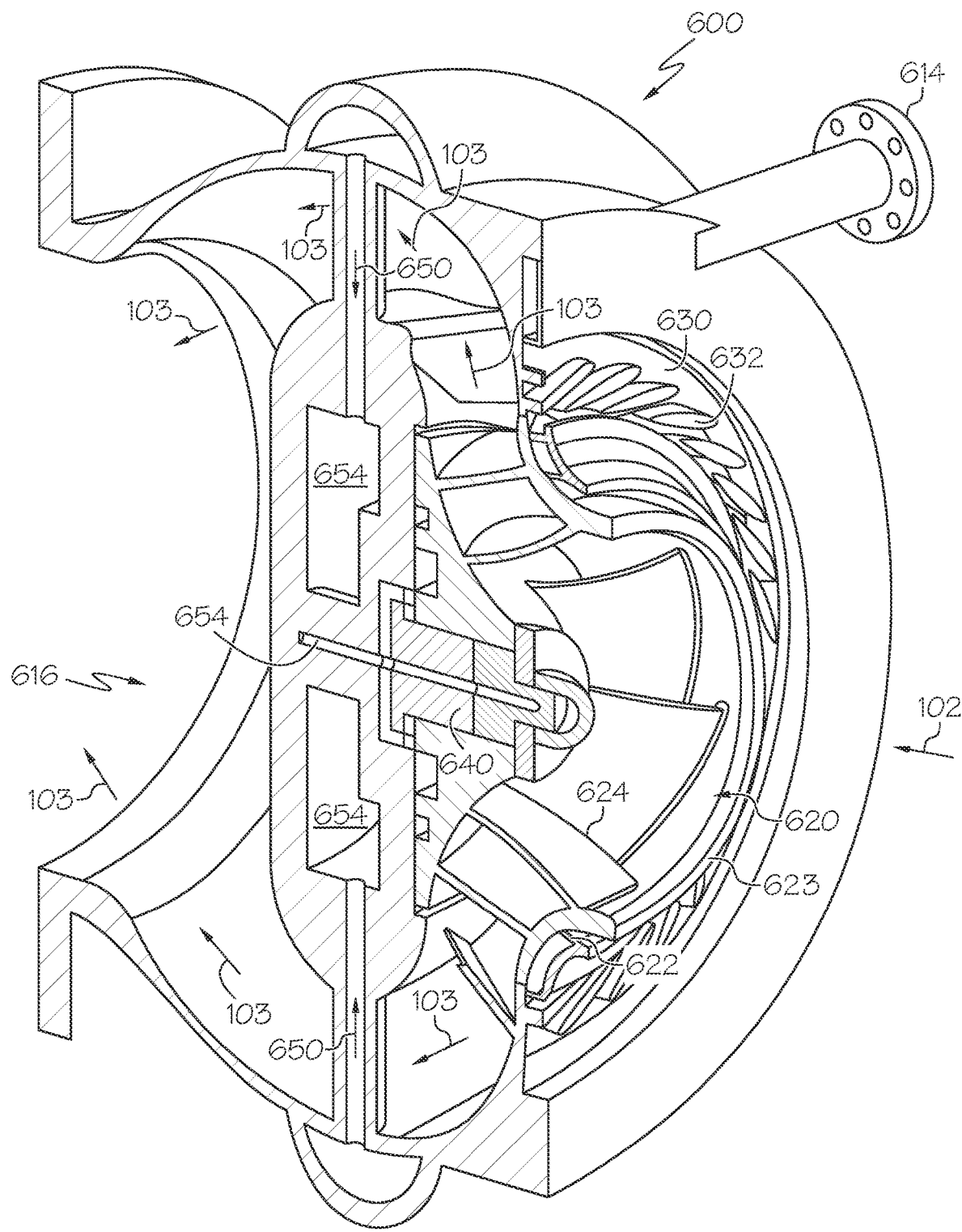
FIG. 7B is a cross-sectional view of the integrated pump having an integrated radial-mixed flow impeller and radial turbine runners according to one or more embodiments shown and described herein.
Figure 7C:
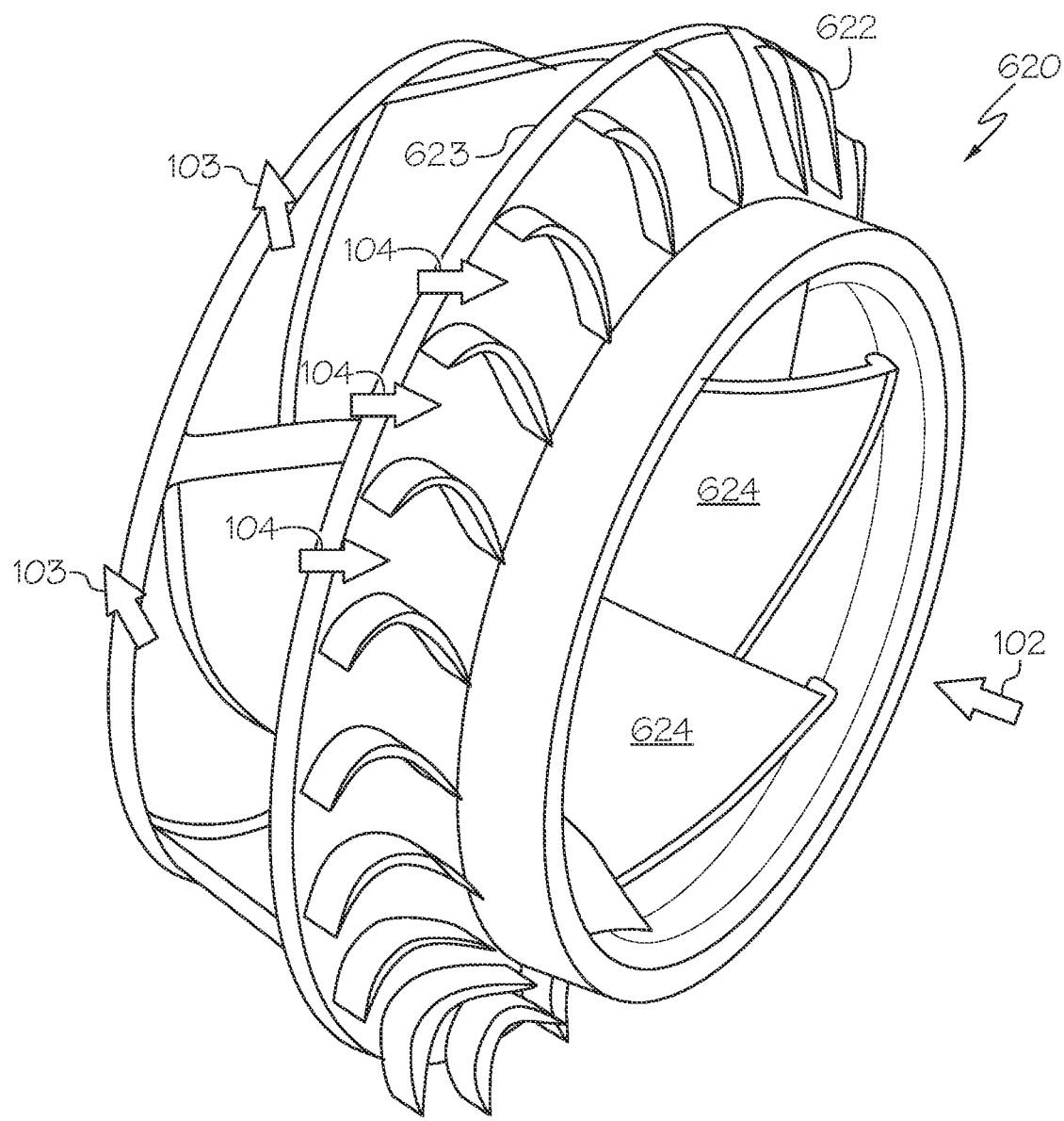
FIG. 7C depicts an illustrative embodiment of the integrated radial-mixed flow impeller and radial turbine runners according to one or more embodiments shown and described herein.

Referring to FIGS. 7A-7C, in some embodiments, an integrated power pump 600 may include a rotor 620 having an integrated radial-mixed flow impeller 624 and radial turbine runners 622 integrated together via a shroud 623. The housing 610 of the integrated power pump 600 includes a process stream inlet 612 that receives a process stream 102 and a process stream outlet 616 that outputs an exit process stream 103 that is an increased flow and/or pressure flow of the process stream 102 received by the integrated power pump 600. The integrated power pump 600 further includes a plurality of power stream inlets 614 that are configured to provide one or more power streams 104 radially into the integrated power pump 400. The one or more power streams 104 are introduced radially about the rotor 620. For example, a power stream 104 may be introduced tangentially to the rotor 620 and in the direction of rotation of the rotor 620. The power stream 104 may be introduced into the integrated power pump 600 at 180-degree, 120-degree, 90-degree, 72-degree, 60-degree, 45-degree, 30-degree intervals or any angular spacing between 360 degrees and 0 degree around the housing 610.

The power streams 104 may be diverted through a plurality of guide vanes 632. The plurality of guide vanes 632 may be positioned on the inner surface of the housing 610 of the integrated power pump 600 or a surface of the stator 630 that faces the rotor 620. The plurality of guide vanes 632 direct the power streams 104 to impinge the radial turbine runners 622 of the rotor 620 such that the impingement of the power streams 104 with the radial turbine runners 622 cause the rotor 620 to rotate. The rotation of the rotor 620 causes the radial-mixed flow impeller 624 that is integrated into the rotor 620 with the radial turbine runners 622 to draw in the process stream 102 and increase the flow and/or pressure thereof thereby generating an exit process stream 103.

For example, as depicted in FIG. 7C, a radial-mixed flow impeller 624 is positioned in an inner portion of the rotor 620 with a plurality of radial turbine runners 622 positioned around the radial-mixed flow impeller 624. As a process stream 102 is drawn into the rotor 620 the energy is added to the process stream 102 as a function of the power stream 104 impinging the plurality of radial turbine runners 622 integrally formed on the rotor 620. An exit process stream 103 is then expelled from rotor as a process stream 102 having increased flow and/or pressure. As shown in FIG. 7B, the exit process stream 103 may flow through the inner portion of the housing and expelled through the process stream outlet 616. The rotor 620 is rotatably supported on a shaft 640. A lubrication 650 flow that is received through a lubrication inlet 652 is routed through arteries 654 in the integrated power pump 600 to create a hydrodynamic bearing or hydrostatic bearing between the rotor 620 and the shaft 640. It is noted that although a single stage radial mixed flow type integrated power pump 600 is depicted, that some embodiments may be configured in a multistage configuration having a plurality of axially aligned rotors 620.

It should be understood that various embodiments of a rotor having an integrated impeller and turbine form the basis of an integrated power pump that does not require a conventional electro-mechanical driving machine, mechanical seals, couplings, and external bearings. More specifically, the integrated power pumps of the present disclosure utilize a high pressure stream referred to herein as a power stream to provide energy to the rotor thereby causing it to rotate. The rotational energy of the rotor is transferred to the integrated impeller of the rotor and the process stream flowing there through. In other words, the received process stream is a low pressure flow, that is, a fluid flow that is lower pressure than the power stream when it is received by the integrated power pump. However, when the process stream exits the integrated power pump the flow and/or pressure is increased.

Integrated power pumps of the present disclosure may be fabricated using conventional methods of machining and molding. Moreover, many components of the integrated power pump can be 3D printed.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A pump, comprising a housing, a process stream input opening, a process stream output opening, a power stream inlet piping coupled to a power stream inlet, and a rotor, wherein:
   the process stream input opening is formed in the housing and is configured to receive a hydrocarbon fluid process stream;
   the process stream output opening is formed in the housing and is configured to output the hydrocarbon fluid process stream;
   the power stream inlet piping is configured to route a hydrocarbon free fluid from a remote location to the power stream inlet;
   the power stream inlet extends from an outer surface of the housing to an inner surface of the housing and is configured to receive a power stream through the power stream inlet piping;
   the rotor comprises an impeller, a shroud, and a turbine;
   the impeller comprises one or more fluid motive elements positioned about a central axis of the rotor and extending outward to the shroud;
   the turbine comprises one or more runners formed on an outwardly facing surface of the shroud of the rotor;
   the shroud extends radially about the one or more fluid motive elements of the impeller;
   the rotor is rotatably supported within the housing such that the shroud and the inner surface of the housing form a fluid path for the power stream to flow through the turbine; and
   the one or more runners of the turbine cause the rotor to rotate when the power stream flows through the fluid path impinging the one or more runners of the turbine thereby transferring energy from the flow of the power stream received through the power stream inlet into rotational energy of the one or more fluid motive elements of the impeller to propel the hydrocarbon fluid process stream from the process stream input opening out the process stream output opening.

2. The pump of claim 1, wherein the fluid path for the power stream to flow through the turbine is fluidly coupled to the process stream output opening thereby intermixing the power stream and the hydrocarbon fluid process stream when the power stream flows through the fluid path and out the process stream output opening with the hydrocarbon fluid process stream.

3. The pump of claim 1, wherein the power stream and the hydrocarbon fluid process stream flow axially through the housing of the pump.

4. The pump of claim 1, further comprises a power stream outlet, wherein the power stream outlet extends from the inner surface to the outer surface of the housing and is fluidly coupled to the power stream inlet, and the power stream is configured to exit through the power stream outlet.

5. The pump of claim 1, wherein the housing comprises a plurality of turbine stators positioned on the inner surface of the housing opposite the rotor and interleaved between the one or more runners of the turbine.

6. The pump of claim 1, wherein the turbine comprises a plurality of vane type turbine runners.

7. The pump of claim 1, wherein the turbine comprises a plurality of Pelton type turbine runners.

8. The pump of claim 1, wherein the turbine is a Tesla turbine.

9. The pump of claim 1, wherein the turbine is a mixed flow type turbine.

10. The pump of claim 1, wherein the rotor is rotatably supported on a stationary shaft within the housing.

11. The pump of claim 1, wherein the rotor is rotatably supported on a rotating shaft via at least one of a hydrodynamic bearing or a hydrostatic bearing.

12. The pump of claim 11, wherein the at least one of the hydrodynamic bearing or the hydrostatic bearing is generated from a lubrication flow from a portion of at least one of the hydrocarbon fluid process stream, the power stream, or an external lubrication source received through a lubrication inlet.

13. A pump system, comprising a high pressure pump and an integrated power pump, wherein:
   the integrated power pump comprises a housing, a process stream input opening, a process stream output opening, a power stream inlet, and a rotor;
   the high pressure pump is fluidly coupled to the integrated power pump and positioned remotely from the integrated power pump;
   the high pressure pump generates a hydrocarbon free fluid power stream;
   the power stream inlet extends from an outer surface to an inner surface of the housing;
   the power stream inlet receives the hydrocarbon free fluid power stream generated by the high pressure pump;
   the process stream input opening is formed in the housing and receives a hydrocarbon fluid process stream;

the process stream output opening is formed in the housing and is configured to output the hydrocarbon fluid process stream;

the rotor comprises an impeller, a shroud, and a turbine;

the impeller comprises one or more fluid motive elements positioned about a central axis of the rotor and extending outward to the shroud;

the turbine comprises one or more runners formed on an outwardly facing surface of the shroud of the rotor;

the shroud extends radially about the one or more fluid motive elements of the impeller;

the rotor is rotatably supported within the housing such that the shroud and the inner surface of the housing form a fluid path for the hydrocarbon free fluid power stream to flow through the turbine; and the one or more runners of the turbine cause the rotor to rotate when the hydrocarbon free fluid power stream flows through the fluid path impinging the one or more runners of the turbine thereby transferring energy from the flow of the hydrocarbon free fluid power stream received through the power stream inlet into rotational energy of the one or more fluid motive elements of the impeller to propel the hydrocarbon fluid process stream from the process stream input opening out the process stream output opening.

14. The pump system of claim 13, wherein the fluid path for the hydrocarbon free fluid power stream to flow through the turbine is fluidly coupled to the process stream output opening thereby intermixing the hydrocarbon free fluid power stream and the hydrocarbon fluid process stream when the hydrocarbon free fluid power stream flows through the fluid path and out the process stream output opening with the hydrocarbon fluid process stream.

15. The pump system of claim 13, wherein the hydrocarbon free fluid power stream and the hydrocarbon fluid process stream flow axially through the housing of the integrated power pump.

16. The pump system of claim 13, further comprises a power stream outlet, wherein the power stream outlet extends from the inner surface to the outer surface of the housing and is fluidly coupled to the power stream inlet, and the hydrocarbon free fluid power stream is configured to exit through the power stream outlet and return to the high pressure pump.

17. The pump system of claim 13, wherein the turbine comprises at least one of a plurality of vane type turbine runners, a plurality of Pelton type turbine runners, or a plurality of parallel disks forming a Tesla type turbine.

18. A process for treating a hydrocarbon fluid process stream with a hydrocarbon free fluid power stream with an integrated power pump comprising a housing, a process stream input opening, a process stream output opening, a power stream inlet, and a rotor, the process comprising:

receiving the hydrocarbon free fluid power stream through the power stream inlet, the power stream inlet extends from an outer surface to an inner surface of the housing of the integrated power pump;

causing the rotor rotatably supported within the housing to rotate when the hydrocarbon free fluid power stream flows through a fluid path defined by at least the inner surface of the housing and an outwardly facing surface of a shroud and the hydrocarbon free fluid power stream impinges one or more runners of a turbine of the rotor formed on the outwardly facing surface of the shroud of the rotor;

propelling the hydrocarbon fluid process stream, with one or more fluid motive elements positioned about a central axis of the rotor and extending outward to the shroud, from the process stream input opening out the process stream output opening as an exit process stream when the rotor rotates in response to the hydrocarbon free fluid power stream flowing through the turbine; and intermixing the hydrocarbon free fluid power stream with the exit process stream such that the integrated power pump outputs the hydrocarbon free fluid power stream and the exit process stream together through the process stream output opening.

19. The process of claim 18, wherein the hydrocarbon free fluid power stream is water.

* * * * *